E. T. SILVIUS.
CREDIT ACCOUNTING REGISTER.
APPLICATION FILED MAY 4, 1909.
1,143,789.
Patented June 22, 1915.
7 SHEETS—SHEET 4.
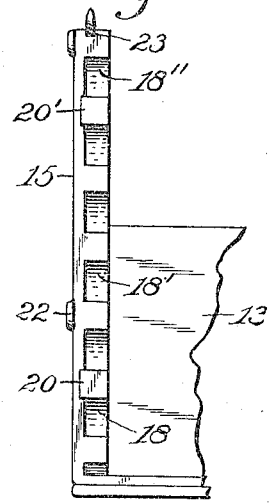
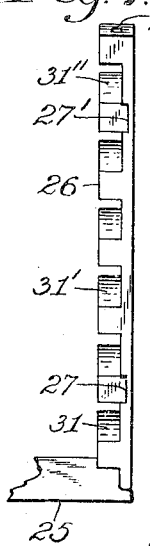
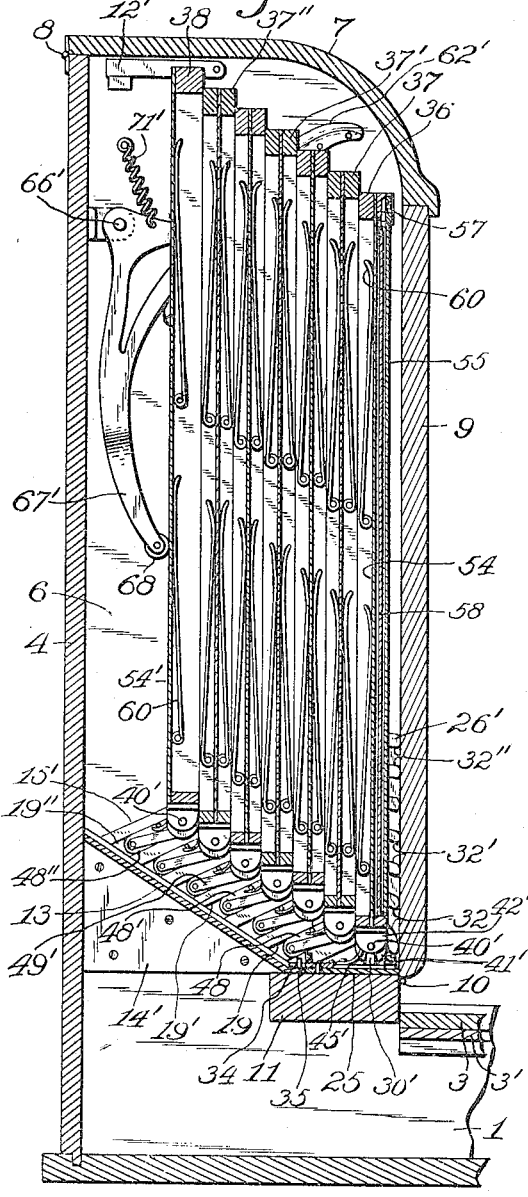
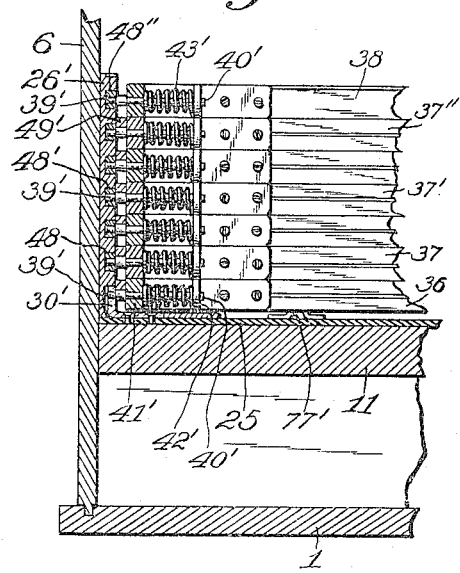
WITNESSES:
J. H. Gardner
K. R. Woddell
INVENTOR:
Ellis T. Silvius.

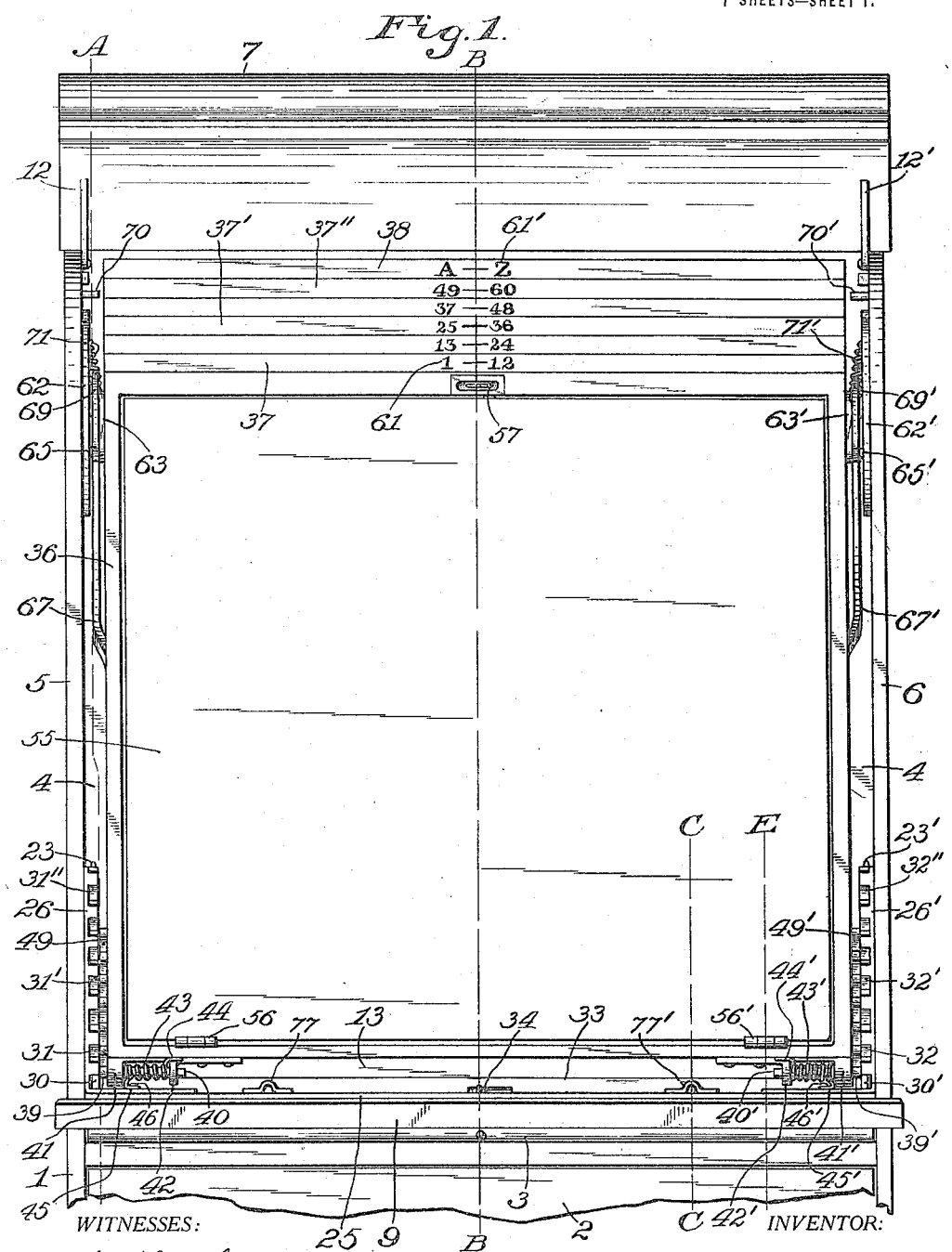

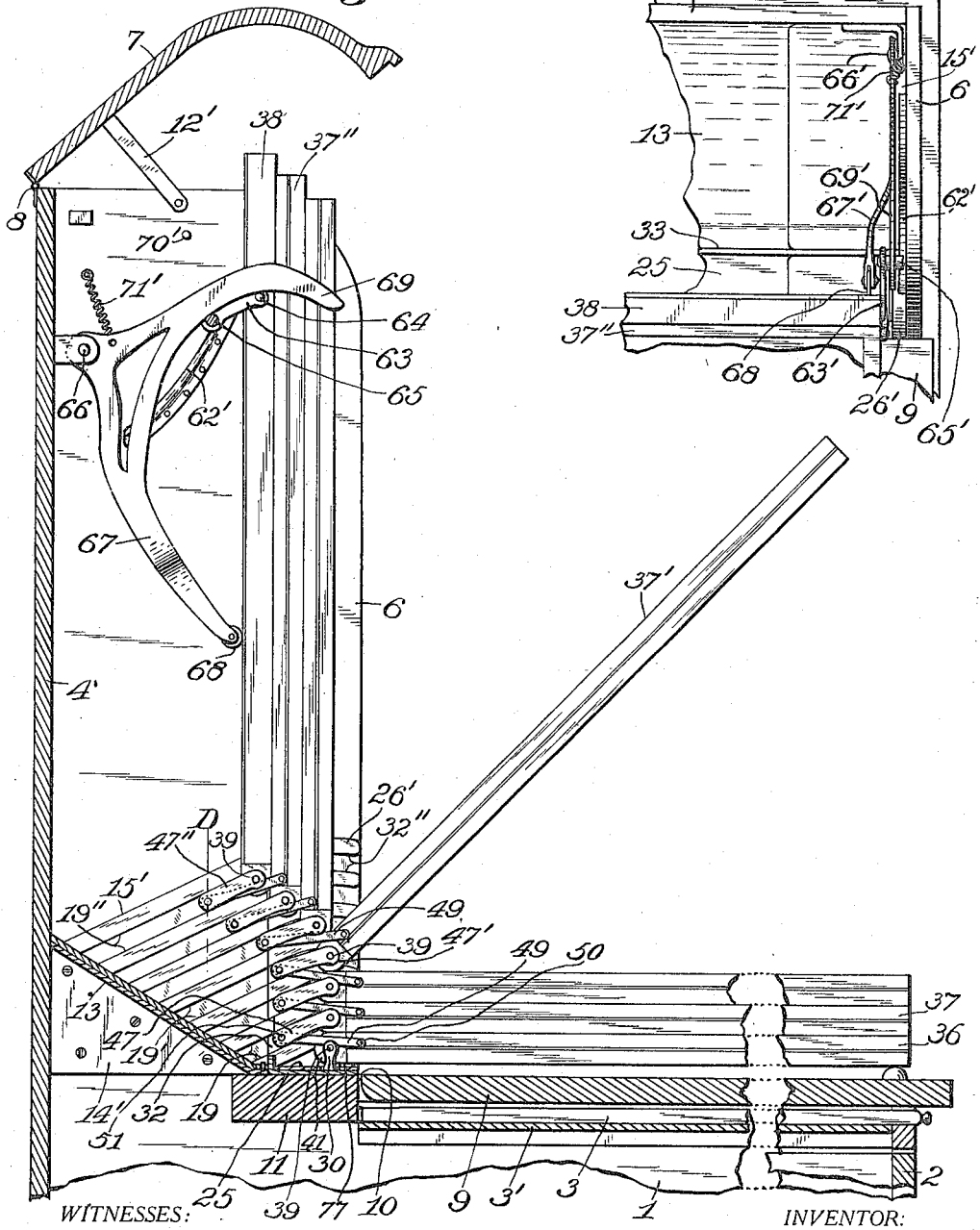

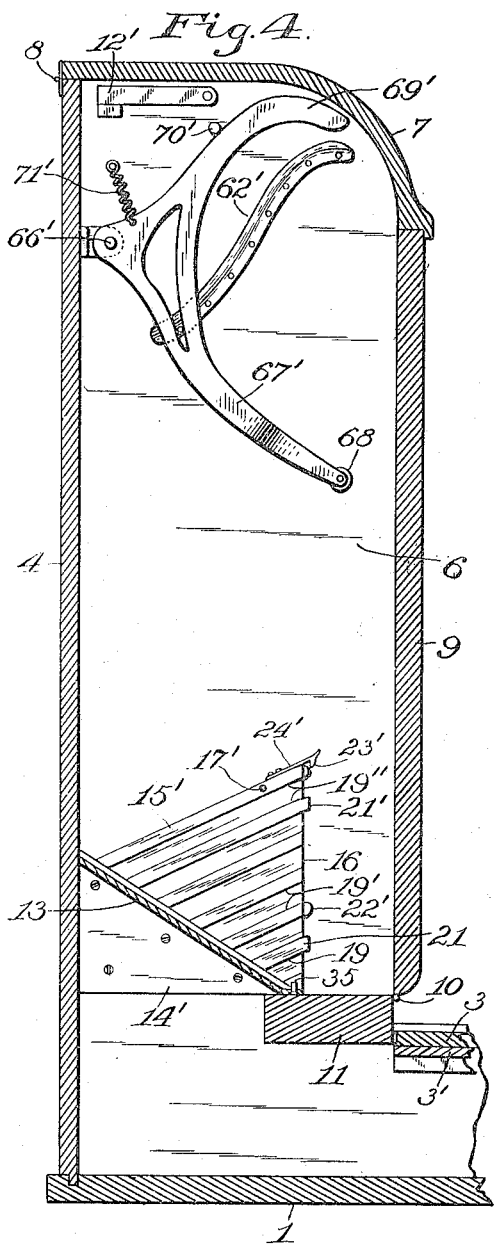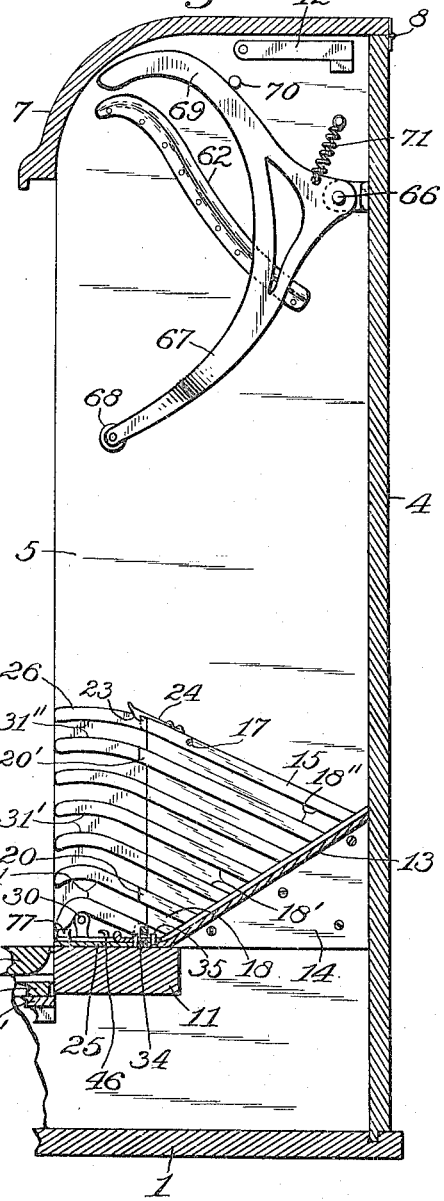

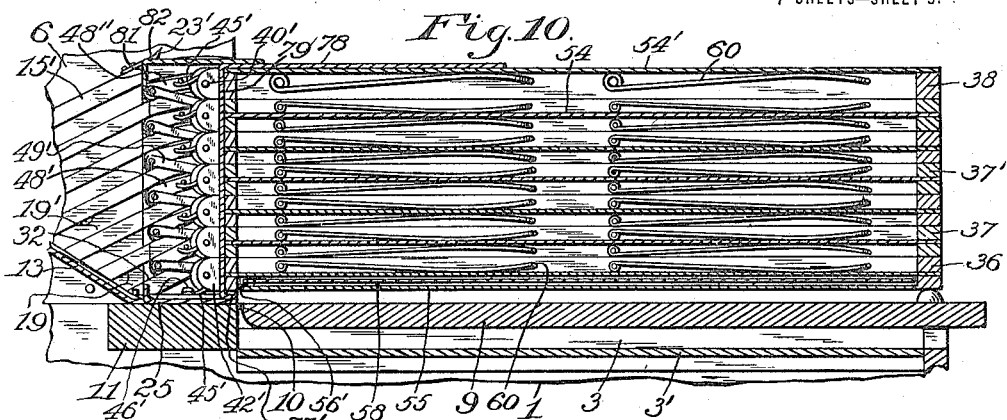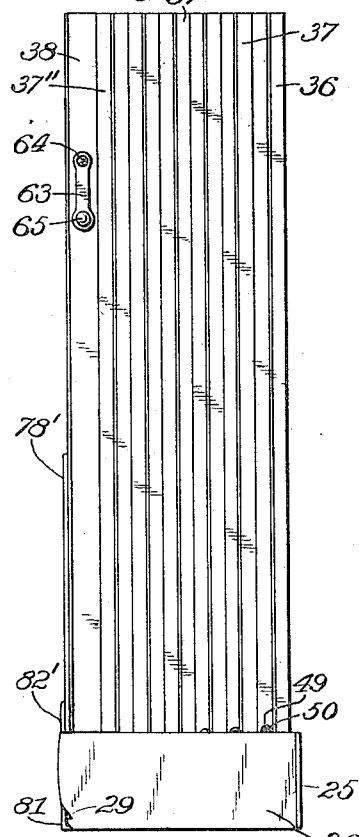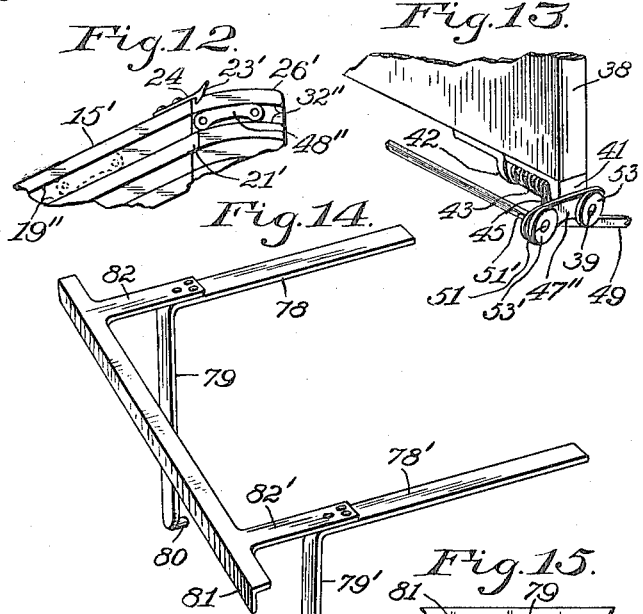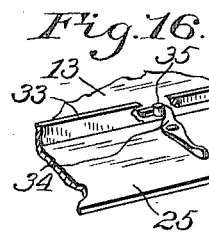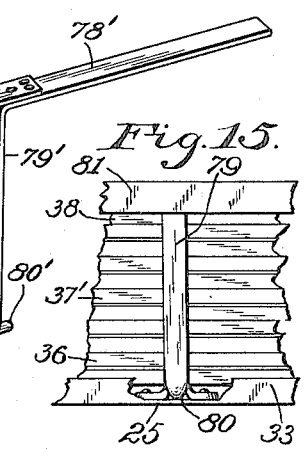

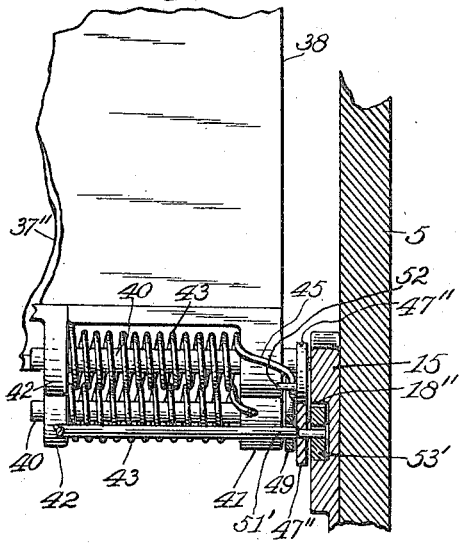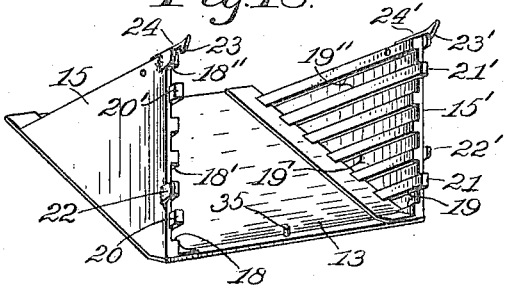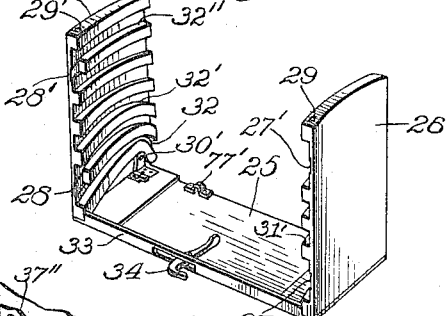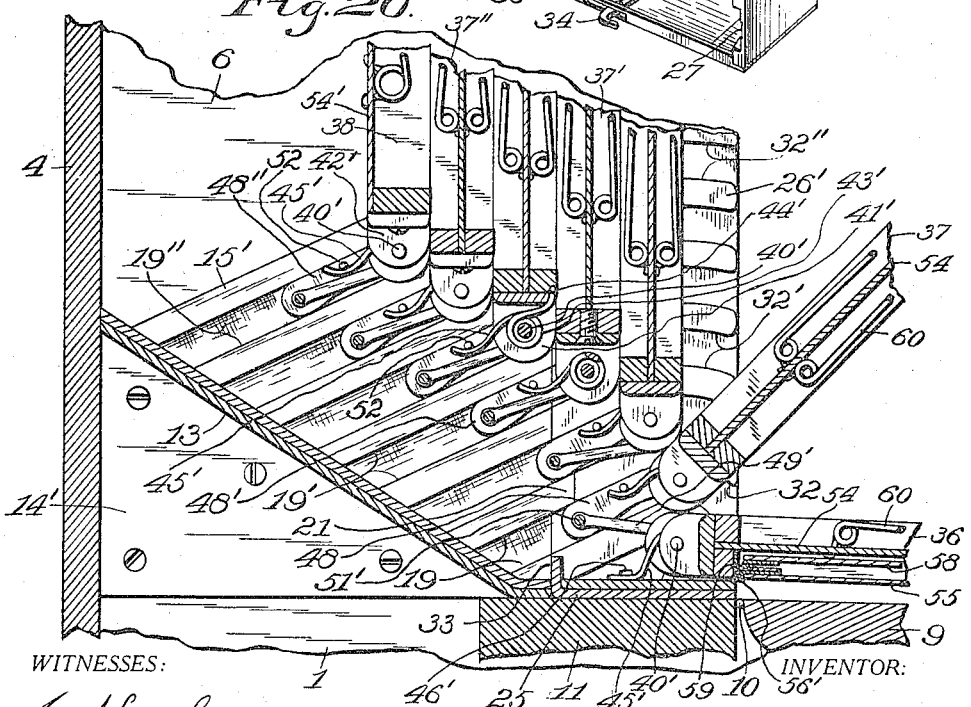

E. T. SILVIUS.
CREDIT ACCOUNTING REGISTER.
APPLICATION FILED MAY 4, 1909.
1,143,789.
Patented June 22, 1915.
7 SHEETS—SHEET 7.
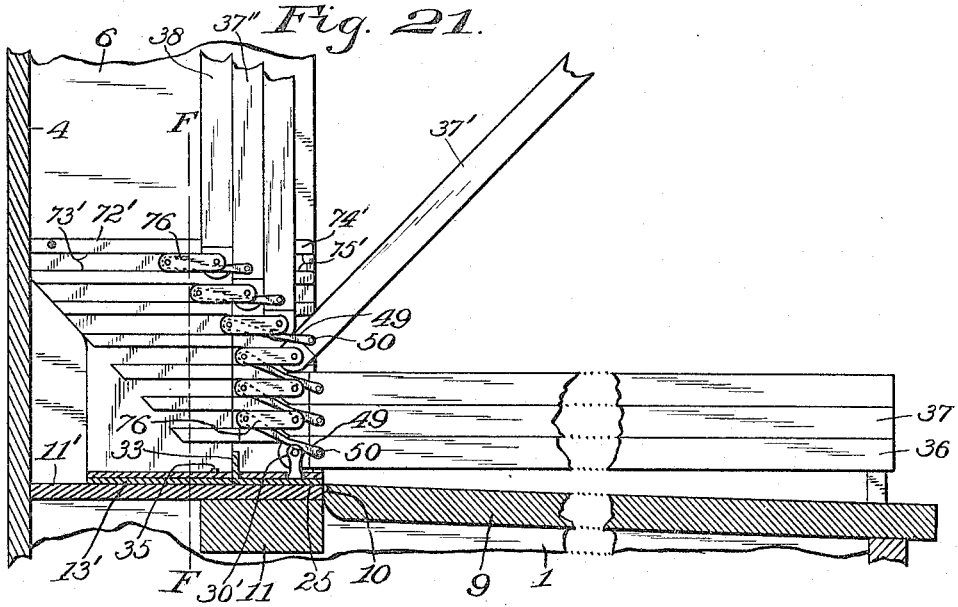
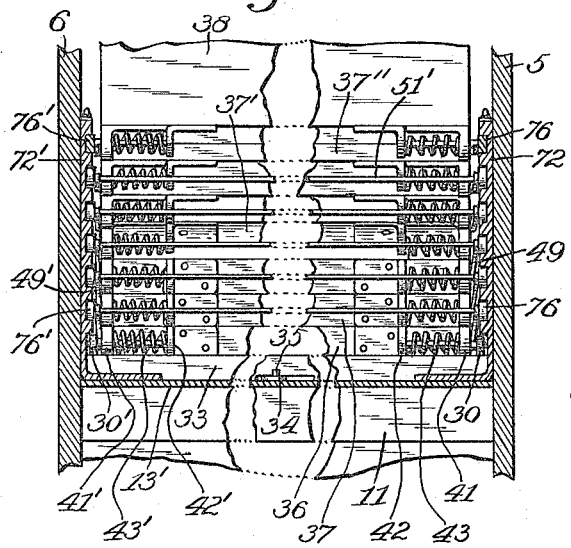
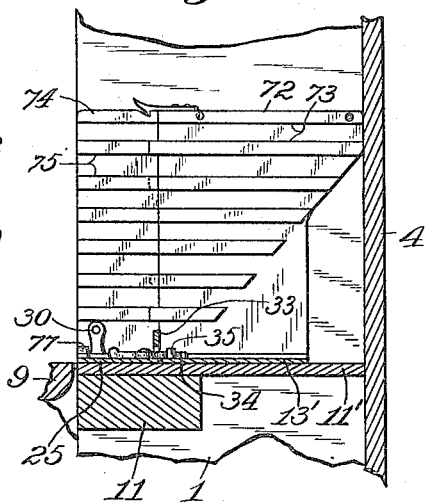
WITNESSES:
J. H. Gardner
K. R. Woddell
INVENTOR:
Ellis T. Silvius.

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

CREDIT-ACCOUNTING REGISTER.

1,143,789.          Specification of Letters Patent.     Patented June 22, 1915.

Application filed May 4, 1909. Serial No. 493,924.

*To all whom it may concern:*

Be it known that I, ELLIS T. SILVIUS, a citizen of the United States, residing at Indianapolis, in the county of Marion and State of Indiana, have invented certain new and useful Improvements in Credit-Accounting Registers; and I do declare the following to be a full, clear, and exact description of the invention, reference being had to the accompanying drawings, and to the letters and figures of reference marked thereon, which form a part of this specification.

This invention relates to filing appliances in which papers of various kinds may be filed in systematic order, especially such filing appliances as are commonly known as credit accounting registers in which duplicate sales bills or slips are filed and indexed, and comprising features of systems for keeping credit accounts economically without the use of the usual regular set of account books.

The invention refers particularly to the type of registers or appliances in which a plurality of leaves or frames are normally supported in upright positions so as to be rotatable and movable to prone positions, in order to permit access to the rearward sides of the leaves, the leaves being adapted to hold the sales bills.

An object of the invention is to provide improvements whereby the apparatus may be adapted to be constructed at relatively small cost, and so that the leaves will be stepped in normal position with the rearward leaves projecting slightly upward beyond the forward leaves, so that the index characters on the upper ends of the leaves may be easily seen; a further object being to provide bill holding leaves which may be inexpensively mounted and supported so as to be in stepped order normally and when prone lie in a rectangular compact group or pile; a still further object being to provide means whereby the leaves when upright will be maintained in their upright positions during their movements forward following those forward of them which may be drawn down to prone positions.

Another object is to provide bill holding leaves mounted in the above-mentioned manner with individual balancing springs for assisting the leaves to rise from prone to upright positions and preventing them from falling forward; other objects of the invention being apparent from a perusal of the following description.

The invention consists in an improved filing appliance comprising a plurality of bill holding leaves or frames, a case therefor having a pair of guide plates therein, crossheads mounted so as to be moved forward or rearward on the guide plates and pivotally supporting and carrying the leaves or frames, excepting the foremost one of the leaves or frames which is mounted in stationary bearings, each leaf or frame, excepting the rearmost one, having a pair of connecting rods pivoted thereto and pivotally connected to the crossheads of the next adjacent rearward one of the leaves or frames.

The invention comprises also individual springs for the leaves mounted thereon in a novel manner, the springs being coiled about the pivotal axes of the leaves or frames and having each an arm anchored to the crosshead of the leaf.

The invention consists further in improvements in construction of the guide plates, and in the apparatus for maintaining the leaves in upright positions or limiting their pivotal movements rearward; and the invention consists further in the parts and combinations and arrangements of parts, as hereinafter particularly described and then defined in the accompanying claims.

Referring to the drawings Figure 1 is a front elevation of the main portion of the improved filing appliance with the supporting base or desk portion broken away, the bill holding leaves being in normal position and the case opened so that the leaves may be operated; Fig. 2, a vertical sectional view approximately at the plane of the line A in Fig. 1 with a number of the leaves drawn forward to prone position and one of the leaves in an intermediate position between the normal and prone position; Fig. 3, a fragmentary top plan view with minor parts omitted; Fig. 4, a vertical sectional view of the case on line B B in Fig. 1 without the leaves, and the case closed, a portion of the guide plate being omitted; Fig. 5, a vertical sectional view of the case on the line B B in Fig. 1 without the leaves, the case being open at front; Fig. 6, a fragmentary front elevation of the frame that supports the leaves and particularly the stationary portion of one of the guide plates;

Fig. 7, a rear elevation of a companion removable portion of the guide plate; Fig. 8, a vertical sectional view of the appliance on the line B B in Fig. 1 with the desk portion broken away and the case inclosing the leaves; Fig. 9, a fragmentary vertical sectional view at the axes of the pivots of the leaves with the latter in prone positions; Fig. 10, a fragmentary vertical sectional view on the line C C in Fig. 1 with the leaves in prone positions and clamped together by means of an attachable device and ready to be removed from the case; Fig. 11, an elevation of the group of leaves removed from the case and set up ready for insertion in a vault or fire proof safe for preservation; Fig. 12, a fragmentary elevation of one of the guide plates and a crosshead thereon; Fig. 13, a fragmentary perspective view of one of the leaves and the connected parts thereof; Fig. 14, a perspective view of the clamp for holding the leaves together, so as to stand upright when removed from the case; Fig. 15, a fragmentary view showing parts of the leaves and devices for holding them upright, as in Fig. 11; Fig. 16, a fragmentary detail showing means for connecting two parts of the frame together that supports the leaves in the case; Fig. 17, a fragmentary sectional elevation showing details of construction as at the plane of the line D in Fig. 2; Fig. 18, a perspective view of the stationary parts of the frame and guides for the leaves; Fig. 19, a perspective view of the removable parts of the frame and guides for the leaves; Fig. 20, a fragmentary sectional view as at the plane of the line E in Fig. 1, the leaves in different positions and portions broken away to show various features of construction; Fig. 21, a fragmentary sectional view showing a slightly modified form of guide plate and crossheads for the leaves as at the plane of the line A in Fig. 1; Fig. 22, a fragmentary vertical sectional view at the plane of the line F F in Fig. 21; and Fig. 23, a fragmentary vertical sectional view of the case and showing a modified form of guide plates for the leaves, as at the plane of the line B B in Fig. 1.

Similar reference characters throughout the different figures of the drawings indicate corresponding elements or features of construction referred to herein.

In construction the filing appliance comprises a case having a suitable supporting base which preferably is in the form of a suitable desk part 1 having a drawer 2 therein above which is mounted a slide 3 movable forward on a desk top 3' and which may be used for conveniently holding an index sheet, the case having an upright back 4 on the rear end of the desk part and also two opposite sides 5 and 6 extending forward from the back. A top or lid 7 is connected to the back by hinges 8 and normally rests on the sides. The case is provided with a front door 9 that is connected by hinges 10 to a frame-bar 11 which is secured in the lower forward portion of the case at the top of the desk part, the door being adapted to be connected with the top 7 for inclosing the bill holding leaves in the case, and the door normally resting in prone position upon the desk part when the appliance is in use. Props 12 and 12' are mounted on the inner faces of the sides 5 and 6 for holding up the top 7 as in Figs. 1 and 2 in order to clear the leaves when in use. Various modifications however may be made in the construction of the case if desired.

A frame base 13 is suitably secured in the lower portion of the case and preferably is adapted to be inclined and supported on blocks 14 and 14' secured to the sides 5 and 6, the base having guide plates 15 and 15' thereon standing against the inner sides of the sides 5 and 6, the guide plates extending from the rear portion of the case forward a suitable distance and having vertical fronts 16, the plates being preferably secured to the sides of the case by screws 17 and 17', so as to be stationary in the case. The inner sides of the guide plates have grooves therein forming guides as 18, 18', 18'', in plate 15 and corresponding guides 19, 19', 19'', in the plate 15', the plate 15 having forward extending projections as 20 and 20' thereon, and the plate 15' having similar projections as 21 and 21' thereon at the inner sides thereof. The plate 15 has also suitable projections 22 extending from the forward end at the outer side thereof adjacent to the side of the case, the plate 15' having similar projections 22'. A pair of latches 23 and 23' having elastic shanks 24 and 24' respectively are mounted by means of the shanks on the top of the plates 15 and 15' respectively. The supporting frame of the leaves comprises also a base plate 25 that normally rests on the bar 11 and two guide plate sections 26 and 26' on the ends of the base plate, the sections having recesses 27 and 27' to receive the projections 20 and 20' and also recesses 28 and 28' to receive the projections 21 and 21', the outer sides of the plates 26 and 26' engaging the other projections 22 and 22', so that the removable sections of the guide plates are guided and held in alinement with the stationary sections of the guide plates, the tops of the sections 26 and 26' having recesses 29 and 29' therein receiving the latches 23 and 23' for normally holding the parts together. The forward portion of the base plate 25 has a pair of pivoting stands 30 and 30' mounted fixedly thereon and the plate 26 has grooves therein forming guides as 31, 31', 31'', alining with the guides that are formed in the companion stationary section 15; the plate 26' having grooves therein forming guides as 32, 32', 32'', alining with the guides formed in the companion stationary plate 15'. The guides in the guide plates may be horizontal, but preferably the guides in the sections 26 and 26' are curved to conform to segments of concentric circles struck from the pivotal axes of the pair of pivoting stands 30 and 30' and extending tangentially to the guides in the stationary sections of the guide plates and downward therein toward the rear portion of the case to any desired degree, which provides that the leaves shall be stepped up only sufficiently to expose index characters of suitable size, thus avoiding the necessity of constructing excessively high exclosing cases for the leaves. The rear portion of the plate 25 has an up-turned flange or rib 33 to stiffen the plate and also serve as a runner when the removable section of the frame base and guide plates are removed from the case with the leaves and stood up as in Fig. 11. A hook 34 is mounted on the base plate 25 and normally engages a projection 35 with which the base plate 13 is provided, for locking the removable section to the stationary section of the frame base.

A suitable number of leaves are constructed in any desired manner, preferably of built-up parts and comprising frames, as 36 indicated as the foremost one, intermediate frames as 37, 37', 37'', and a rearmost frame 38, one end of each frame having a pair of pivots 39 and 39' in alinement and projecting beyond opposite sides of the frame and preferably formed on the ends of rods forming spring guides as 40, 40' secured tightly in projections 41 and 41' on the pivotal ends of the frames, the rods extending through ears 42 and 42' suitably attached removably on the pivotal ends of the frames. Coil springs 43 and 43' are mounted on the rods, one spring between each projection and opposing ear, and each spring has one arm as 44 or 44' extending against the forward side of the adjacent ear, so as to act to push the frame upward to normal position, the springs each having also an arm 45 or 45' adapted to be anchored, as will further appear. The pivots of the foremost leaf 36 are mounted permanently in the pivoting stands 30 and 30' and normally stands upright and so as to be movable to a prone position on the top of the desk part of the case, and the arms 45 and 45' of the foremost leaves are anchored under clips 46 or 46' with which the plate 25 is provided.

Each one of the bill holding leaves excepting the foremost one is provided with a pair of crossheads on which the leaf is mounted by means of its pivots 39 and 39', the crossheads being mounted movably in the guides and form parts of the connections between the leaves, there being a suitable number of crossheads as 47, 47', 47'', mounted in the guides of the guide plate 15 and similar crossheads 48, 48', 48'', mounted in the guides of the guide plate 15'. Each leaf frame, excepting the rearmost one, has a pair of connecting rods 49 and 49' connected thereto by pivots 50 in a plane above the pivots of the leaf, and the connecting rods extend rearward and are pivotally connected to the crossheads of the next adjacent rearward leaves rearward of their pivots by means of pivots 51, whereby the upright leaves are moved forward or rearward when the leaves forward of them are moved pivotally. In some cases the pivots 51 may be formed as parts of rods 51' adapted to extend from one crosshead to the other crosshead of the pair provided for a leaf, so that the two crossheads operate practically as one, the rods serving to prevent lost motion of the crossheads laterally. Each crosshead has a projection 52 on the inner side thereof that is engaged by the arm 45 or 45' of the spring of the leaf that is mounted on the crosshead. If desired, however, it is obvious that the arms of the springs might be extended in length, so as to be anchored to the rods 51'. In some cases the crossheads may be provided with rollers 53 and 53' mounted on the pivots 39 and 39' and the pivots 51, so as to reduce friction of the crossheads with their guides. The crossheads as will be seen are adapted to operate both on straight portions and curved portions of the guides, and the arrangement of the crossheads and connecting rods is such that they hold the leaves close together when upright, and the guides being spaced apart suitably permit the leaves to lie close together one upon another when prone with the pivots of the leaves in one and the same vertical plane so that the leaves form a rectangular pack with their forward ends in one vertical plane. When a leaf is moved from prone to upright position it will cause the rearward leaves to move rearward, and when an upright leaf is moved forward to prone position the rearward leaves will be drawn forward to bring the foremost one to the position previously occupied by the operated leaf.

The bill holding leaves comprise plates 54 or 54' attached to the frames of the leaves, and the foremost frame 36 has a shutter 55 mounted therein by means of hinges 56 and 56' at the pivoted end of the frame, the free end of the shutter being connected to the frame by a suitable latch 57. A leaf 58 is connected to the inner side of the shutter by means of hinges 59, and the inner side of the shutter and the leaf thereon may be conveniently used for various purposes, such as holding index sheets. The plates 54 and 54' have bill clamps 60 mounted thereon as usual for holding papers on the plates in systematic order as is commonly known, the forward sides of the upper ends of the leaf frames having index characters as 61, 61' thereon according to well known practice, these characters being easily seen by one standing at the front of the appliance, so that either one of the frames may be readily selected to be moved forward or reclined when required in order to have access to the bill slips.

In order to limit the rearward motion of the leaves and maintain them in perpendicular positions during their forward or rearward movements suitable mechanism is provided which comprises a pair of irregularly curved guides 62 and 62' that are secured to the upper portions of the sides 5 and 6 on the inner sides thereof; the rearmost leaf frame 38 has a pair of links 63 and 63' connected to the sides of the upper portion thereof by means of pivots 64, and the ends of the links have guide pins 65 and 65' thereon that extend laterally onto the guides 62 and 62' respectively; two pivots 66, 66' are suitably supported in the rear portion of the case near the top thereof, and a pair of arms 67 and 67' are mounted on the pivots, each arm having preferably a roller 68 on its end to engage the rear side of the rearmost leaf, the arms having upward extending curved guide arms 69 and 69' thereon that normally engage the upper sides of the guide pins 65 and 65', so that as the guide pins are moved upward or downward by the leaf frame the guide arm is moved upward or downward correspondingly to control the to and fro movements of the arms carrying the roller 68 against the leaf, and it will be seen that as the leaf moves upward and forward the rollers will also move upward and forward against the leaf, and when the leaf is moved rearward and downward it will be apparent that the leaf springs will cause the arms 67, 67' to move rearward as much as will be permitted by the arms 69 and 69' which can travel only so far as permitted by the guide pins 65 and 65' guided on the guides 62 and 62', the downward movement of the guide pins being governed by the downward movement of the leaf. The sides of the case are provided with suitable stops 70 and 70', and springs 71 and 71' are mounted on the case sides for normally drawing the arms 69 and 69' up against the stops when the bill holding leaves are out of the case, but the springs and stops may be omitted if desired.

When it is desired that the leaves be stepped up to a greater extent than hereinbefore indicated the guides for the crossheads of the leaves may be modified so that in lieu of the inclined and curved guides described a base plate 13' may be secured on a foundation 11', the base plate having a pair of suitable guide plates 72 and 72' thereon in which are horizontal guide grooves 73 and 73' respectively to form straight guides, the forward base section 25 having guide plates 74 and 74' thereon joined detachably to the stationary plates 72 and 72' and having straight horizontal guide-grooves 75 and 75' therein in alinement with the guides of the stationary guide plates; and crossheads 76 and 76' are mounted in horizontal guides and support the leaf frames, the connecting rods being employed as hereinbefore described.

The forward portion of the base plate 25 is provided with two eyes 77 and 77'; a clamp is provided comprising two bars 78 and 78' having right angled extensions 79 and 79' at the ends of which are lateral pins 80 and 80' to enter the eyes for locking the leaves when in prone position to the removable section of the leaf supporting guide frame, the bars 78 and 78' extending from the pivoted end against the back of the rearmost leaf and the arms 79 and 79' extending against the pivoted ends of the leaves to hold them in alinement, the clamp comprising an angle bar 81 that is connected to the bars 78 and 78' by means of tie-bars 82 and 82', the angle-bar being designed to be opposite the flange 33 and serving as a runner and support for the rearward leaves when standing up on the plates 26 and 26', as in Fig. 11. The clamp may be placed in position as in Fig. 10, and may be removed from the leaves also when the leaves are in prone position.

When the leaves are mounted in straight horizontal guides as indicated in Fig. 21 any suitable well known means other than hereindescribed may obviously be employed for maintaining the upright leaves in their normal positions during their forward or rearward movements. It should be understood also that any suitable form of device for holding the bill slips on the leaves may be employed that may be preferred; and also various modifications are contemplated with respect to the details of construction within the scope of the appended claims.

In operation the bill holding leaves being stepped when upright will enable the operator to readily see the index characters thereon and select any leaf required which may be drawn forward with those forward of it to prone position, in order to have access either to the rear side of the prone leaf or to the forward side of the foremost one of the remaining upright leaves. When the prone leaves are returned to their normal positions they may be prevented from falling forward by the leaf springs, and the springs may operate to push the arms 67 and 67' rearward as the rearmost leaf recedes; the various movements of the mechanism having been heretofore described will be readily understood. When it is desired to remove the leaves from the case of the latches 23 and 23' and the hook 34 will be disengaged from their companion devices, and the hook 34 should be swung around on its pivot so as to not project through the flange 33, and then the clamp as above described may be connected to the base plate 25 and with the leaves, after which the base plate and the guide plates thereon may be removed from the case with the leaves and the clamp and stood up as in Fig. 11, and when it is again desired to replace the leaves in the case they may be readily set in position as in Fig. 11 after which the clamp may be removed and the removable sections of the guide plates latched to the stationary sections, and then the leaves may be moved upward to their normal positions.

Having described the invention, what I claim, is—

1. The combination of a base having thereon a pair of guide-plates provided with guides, a plurality of leaves normally arranged in vertical position, cross-heads to which all of said leaves excepting the foremost one are pivotally supported, the foremost one being pivotally supported on stationary bearings, means for connecting each leaf to the crosshead of an adjacent leaf, and springs mounted on the leaves individually, the spring of the foremost leaf being anchored to the base and the springs of the remaining leaves anchored to the crossheads of the leaves.

2. A pair of stationary guide-plates, a base-plate having a pair of guide-plates thereon that are detachably connected to the stationary guide-plates, a plurality of crossheads mounted to move on the guide-plates, a plurality of leaves of which the foremost one is pivotally mounted on the base-plate and the remaining leaves pivoted to the crossheads, connections between the leaves and the cross-heads, and means for locking the base-plate and the guide-plates substantially to the plurality of leaves.

3. A plurality of leaves arranged in series, a base-plate pivotally connected to one of the leaves and having a pair of guide-plates thereon, crossheads mounted movably on the guide-plates and pivotally connected to the remaining leaves, rods connecting the leaves with the crossheads, springs on the leaves in engagement with the crossheads, and stationary guide-plates with which the guide-plates on the base-plate may be detachably connected to coöperate therewith.

4. The combination of a casing, a pair of guide-plates mounted in the casing, the guide-plates having guide-grooves therein, a pair of detachable guide plates having guide grooves arranged to aline with the first-mentioned guide grooves and a pair of pivot bearings, a series of bill holding leaves having pivots, and means for slidably supporting and connecting said leaves together, said means including a plurality of crossheads each mounted movably in and supported by a guide groove, and the pivots of the foremost one of the leaves being mounted in the pivot-bearings and the pivots of the remaining leaves mounted in the crossheads, the said detachable guide plates being of a length to receive the crossheads, whereby said leaves and the detachable plates can be removed together from the casing.

5. The combination of a casing, a pair of plates provided with alined guides, a member removably mounted in the casing and comprising a base and side plates provided with alined guides which register with the first-mentioned guides, bearings carried by the base, a series of leaves adapted to be assembled face to face, connections between said leaves permitting them to be inclined relatively to each other, the said connections including a plurality of cross-heads each slidably supported in a pair of alined guides, the frontmost leaf being mounted in said bearings, the guides in said side plates of the removable member being of a length to receive the said crossheads, whereby said leaves and removable member may be removed together from the casing, and means separate from the pivotal connection between the base and frontmost leaf for connecting the series of leaves and removable member together.

6. A case, a pair of stationary pivot-bearings in the case, a pair of guide-plates stationary in the case and each provided with a plurality of guides, a plurality of crossheads mounted movably on the guides, one for each guide, a plurality of normally upright leaves having pivots, the pivots of the foremost one of the leaves being mounted on the pivot-bearings and the pivots of the remaining leaves mounted on the crossheads, the leaves being movable to prone position, rods pivoted to the leaves and the crossheads of the adjacent rearward leaves, an inclined guide secured in the case, a link pivoted to the rearmost one of the leaves and having a guide-pin thereon engaging the inclined guide, and an arm pivoted in the case and adjustably engaging the rearmost one of the leaves and having a controlling arm engaging the guide-pin.

7. A base, two sectional guide-plates comprising each a main part that is secured fixedly to the base and a removable part that is secured detachably to the main part, said guide-plates having guide-grooves therein that are curved at their forward ends and have straight portions that extend rearward and downward, crossheads mounted in the guide-grooves and adapted to move in the curved and straight portions thereof, pivot-bearings rigid on the removable part, a plurality of leaves grouped together uprightly, the foremost one of the leaves having pivots mounted in the pivot-bearings and the remaining leaves having pivots mounted in the crossheads, means for connecting the forward leaves with the crossheads of the rearward leaves, automatically movable means for limiting the rearward pivotal movements of the leaves, and means for normally moving the leaves toward the movement-limiting means.

8. A case, a pair of guide-plates fixedly secured to the case and having each a plurality of inclined guide-grooves therein that extend from the forward ends thereof rearward and downward, a base secured removably in the case and having a pair of sections of guide-plates rigid thereon that have guide-grooves therein, the base having also a pair of pivot-bearings rigid thereon, portions of the grooves in the sections of guide-plates being curved and concentric to the axis of the pivot-bearings and extending to the inclined guide-grooves to form continuous guides, means for securing the sections of guide-plates to the fixedly-secured guide-plates, a plurality of cross-heads mounted movably in the continuous guides, one in each guide, a plurality of normally upright leaves having each a pair of pivots, the pivots of the foremost one being mounted in the pivot-bearings and the pivots of the remaining leaves mounted in the crossheads, and rods pivoted to the leaves and also to the crossheads of the rearward adjacent leaves.

9. A support, two sectional guide-plates comprising each a main part that is secured fixedly to the support and a removable part that is secured detachably to the main part, said guide-plates having guide-grooves therein that are curved at their forward ends and have straight portions that extend rearward and downward, crossheads mounted in the guide-grooves and adapted to move in the curved and straight portions thereof, pivot-bearings rigid on the removable part, a plurality of leaves grouped together uprightly, the foremost one of the leaves having pivots mounted in the pivot-bearings and the remaining leaves having pivots mounted in the crossheads, and means for connecting the forward leaves with the crossheads of the rearward leaves.

10. In a filing appliance, the combination of a support, provided with two series of stationary guides, a base removably fixed to the support, plates mounted on the base, and each provided with a series of guides arranged to register with the stationary guides, a series of assembled leaves normally arranged in upright position, means for pivotally supporting the front leaf of the series of leaves on said base, a series of pairs of cross heads, one pair for each of the remaining leaves of the series and each slidably mounted in one of said guides, means for pivoting each leaf to an adjacent crosshead, and means connecting the leaves together but permitting them to swing on their respective pivots.

11. In a filing appliance, the combination of a support comprising a stationary section and a removable section in front thereof, each provided with guides, a series of crossheads, each slidably mounted in one of said guides, a series of assembled leaves normally arranged in upright position, means for pivoting the front leaf of the series of leaves to said removable guide section, means for pivoting each of the remaining leaves to one of said crossheads, permitting it to be reclined, connections between the leaves operating, when one or more of the leaves are reclined to move the lower edges of the remaining leaves forwardly, whereby all of said crossheads will be moved onto the guides carried by the removable guide section when all the leaves are reclined and means permitting the rigid connection of the leaves and removable guide section together after the said leaves have been moved to the reclined position.

12. In a filing appliance, a casing, a series of leaves, means permitting the leaves to swing from a vertical to a horizontal position and vice versa, a member pivoted above the lower edges of the leaves and engaging with a leaf of the pack, and means forcing the pivoted member into engagement with the said leaf.

In testimony whereof, I affix my signature in presence of two witnesses.

ELLIS T. SILVIUS.

Witnesses:
HARRY D. PIERSON,
J. H. GARDNER.

Copies of this patent may be obtained for five cents each, by addressing the "Commissioner of Patents, Washington, D. C."